Patented Oct. 15, 1940

2,218,026

UNITED STATES PATENT OFFICE 2,218,026

ORGANIC CONDENSATION

Virgil L. Hansley, Niagara Falls, N. Y., assignor to E. I. du Pont de Nemours & Company, Wilmington, Del., a corporation of Delaware No Drawing. Original application June 25, 1936, Serial No. 87,257. Divided and this application August 18, 1938, Serial No. 225,597

7 Claims. (Cl. 260—410)

This invention relates to the preparation of condensation products of organic compounds and more particularly to condensations of esters, or of esters with ketones or aromatic aldehydes.

This application is a divisional of my copending application Serial No. 87,257, filed June 25, 1936, now Patent No. 2,158,071.

Condensations of the above type, generally referred to as "Claisen condensations," have long been known. Various condensing agents have been used in effecting such condensations. Among the more common of these are metallic sodium and sodium alcoholate although sodamide, alkali metals other than sodium and their alcoholates, as well as alkali earth metals and alcoholates of alkali earth metals likewise have been used in certain instances.

Condensation reactions of the above type in general have been unimportant except from a laboratory standpoint since the yields obtainable are relatively low when condensations are carried out by means of the usual condensing agents. This is generally due to the occurrence of side reactions when an alkali metal or alkali earth metal is the condensing agent, or to the formation of by-product alcohol when an alcoholate is employed.

An object of the present invention is to provide an improved condensing agent for use in condensation reactions involving esters, esters and ketones, and esters and aromatic aldehydes. Another object is to provide a condensing agent that does not effect reduction of the reactants or reaction products during such condensation reactions. A further object is a method for carrying out condensations of esters, esters and ketones, and esters and aromatic aldehydes whereby good yields of condensation products are obtainable. Other objects will be hereinafter apparent.

These objects are accomplished in accordance with the present invention by employing a metal hydride of an alkali or alkali earth metal as the active condensing agent. I have found that such hydrides are highly effective condensing agents in the above type of reactions in that condensations may be effected with high yields of the desired condensation products, which yields are unobtainable when the previously known condensing agents are employed.

The alkali metal hydrides are especially well suited for the present use although hydrides of the alkali earth metals likewise may be advantageously employed. However, for reasons which will be hereinafter apparent I prefer to practice my invention using sodium hydride, preferably in a finely divided state, as the active condensing agent.

Sodium hydride of suitable form and purity may be conveniently prepared according to the method described in U. S. Patent 1,958,012. The hydride obtained by this method is finely divided and has a purity of 99–100%. It is best handled as a powder moistened with the inert hydrocarbon in which it has been prepared. When finely divided sodium hydride is covered with an inert hydrocarbon such as kerosene, it is practically inert to the atmosphere and may be handled without danger of spontaneously igniting.

Sodium hydride prepared by the method of the above patent possesses several advantages over sodium for use in the condensation reactions under consideration. Since these condensations generally require temperatures below the melting point of sodium, the latter is generally subdivided by heating in an inert solvent before it is used. Usually this requires a solvent different from that in which the reaction is to take place. On the other hand sodium hydride is finely divided as prepared and can be preserved indefinitely when wet with the inert organic medium in which it is prepared. In addition sodium hydride possesses to a large measure all of the condensing powers of sodium itself but retains little or none of the reducing power of sodium towards carbonyl compounds such as aldehydes, ketones, and esters. The use of sodium hydride therefore gives higher yields of condensation products since by-products due to the reduction of the reactants or reaction products are eliminated. Furthermore, condensation reactions effected by the use of sodium hydride appear to be more direct than those effected with sodium since during a condensation with sodium the reaction mixture is deeply colored whereas when sodium hydride is used the reaction mixture remains white or at most only faintly colored throughout. Finely divided sodium hydride moistened with benzene or kerosene is less hazardous to handle, less hydroscopic, and more inert to constituents of the air than is metallic sodium in the same state of subdivision.

Sodium hydride is generally better adapted for carrying out these condensations than is sodium alcoholate. Sodium hydride is essentially an alcoholate in its reactions except that no alcohol is formed as a by-product from the hydride. Since many of these reactions are equilibrium reactions with alcohol being a reaction product, sodium hydride is particularly useful since by its use a minimum amount of by-product alcohol is formed in the mixture. Also, in syntheses of the acetoacetic type, if various esters are desired, any ester can be made by means of one condensing agent, sodium hydride, while if an alcoholate is used a different alcoholate is required for each ester. For instance, in preparing methyl acetoacetate sodium methylate is required, whereas in preparing ethyl acetoacetate sodium ethylate is required. On the other hand, sodium hydride is an excellent condensing agent for either reaction. Another advantage of sodium hydride over sodium alcoholate is that in many cases the reaction mixtures are more fluid when the hydride is used than when an alcoholate is used.

Alkali and alkali earth metal hydrides and especially sodium hydride may be used to carry out condensations of saturated esters in general. Condensations may be effected with saturated aliphatic or aromatic esters of low or high molecular weight provided that one of the ester members has a carbon atom adjacent to the carbonyl radical, which carbon atom is essentially aliphatic in reaction and holds at least one hydrogen atom. Obviously, condensations may be effected between molecules of a single ester or between molecules of two or more esters, it being essential only that one of the condensing members be of the type described in the line above. Esters which may be used in accordance with the present invention include, among others, the saturated esters of low molecular weight acids, such as acetic, propionic and butyric acids, and the saturated esters of the higher molecular weight acids, such as capric, lauric, myristic, palmitic and stearic acids.

Condensations likewise may be carried out in accordance with the present invention involving any ester and any ketone as the condensing members it being only necessary that the ketone employed have a carbon atom adjacent to the carbonyl group which carbon atom is essentially aliphatic in reaction and which holds at least one hydrogen atom. Examples of such ketones are, among others, acetone, methyl ethyl ketone, acetophenone, cyclohexanone, and alpha tetralon, etc. Any ketone which is aliphatic or hydroaromatic in nature may be employed as one of the condensing members.

In practicing the present invention to effect condensations between esters and aromatic aldehydes, any aromatic aldehyde may be employed. Likewise any saturated ester may be used as one of the condensing members provided the ester contains a carbon atom attached to the carbonyl group which is essentially aliphatic in reaction and which has attached thereto at least one hydrogen atom.

In practicing my invention the amount of alkali or alkali earth metal hydride employed may vary. When, for example, sodium hydride is employed one mole may be conveniently and effectively used for effecting a condensation to produce theoretically one mole of reaction product although in some instances it is advantageous to employ twice the above amounts. When the reaction is an equilibrium reaction with a mole of alcohol as a reaction product the use of two moles of metal hydride removes completely the by-product alcohol and thus effects a more complete reaction in the desired direction. In any case, the amount of hydride employed has but a slight effect on the final cost of the reaction product, especially when sodium hydride is used, since the molecular weight of the lattter is relatively small.

The following examples illustrate a few of the numerous adaptations for which my invention may be used.

*Example I*

Benzaldehyde, 106 grams (1 mole), was added dropwise to a stirred suspension of 30.2 grams (1.26 moles) sodium hydride in 460 cc. (excess) of ethyl acetate cooled to 0° C. The time required for the reaction was 1.5 hours. The reaction mixture was then acidified with acetic acid and worked up in the usual manner. The yield of distilled ethyl cinnamate was 149 grams or 85% based upon the benzaldehyde used.

*Example II*

Benzaldehyde, 106 grams (1 mole), was added slowly to a suspension of sodium hydride, 28.8 grams (1.2 moles), in an excess of dry and essentially alcohol-free methyl acetate, which served as a reactant and solvent. The rate of reaction was controlled by the temperature, −10° C., and by the rate of addition of the aldehyde so that a slow but steady rate of hydrogen evolution was maintained. As soon as the calculated amount of hydrogen had been evolved the reaction mixture was acidified with acetic acid and methyl cinnamate isolated by distillation. 116 grams or a 72% yield of methyl cinnamate resulted. Along with this 46.5 grams of methyl acetoacetate was obtained (a 30% yield based on the sodium hydride used).

*Example III*

A 50% slurry of sodium hydride in xylene containing 1 mole of sodium hydride was treated with an excess (2.59 moles) of ethyl acetate. The latter was added slowly at 20–30° C. to the hydride suspension. The reaction mixture was stirred for 2.5 hours after the correct amount of hydrogen was evolved. The mixture was then acidified and worked up in the usual manner, 62 grams of ethyl acetoacetate being obtained. This is the maximum yield obtainable from 1 mole of sodium hydride without removing by azeotropic distillation the by-product alcohol which would be formed if the reaction were to proceed further.

*Example IV*

Acetone, 58 grams, was added slowly to a suspension of sodium hydride, 48 grams (2 moles) in 500 cc. of ethyl acetate at 0° C. After the addition of the acetone and the theoretical amount of hydrogen had been evolved the reaction mixture was acidified with acetic acid and the acetylacetone precipitated as the copper salt, $(C_5H_7O_2)_2Cu$. This salt was filtered, washed, and dried. Upon regeneration, 85.5 grams or an 85.5% yield of acetylacetone, B. P. 137° C. was obtained.

*Example V*

Acetone, 58 grams, was slowly added to a suspension of two moles of sodium hydride in 400 cc. (excess) of methyl caprate. The reaction was complete at 20 to 25° C. after 70 minutes of moderate agitation. The reaction mixture was neutralized with glacial acetic acid, washed with water and the reaction product, tridecane-2,4-dione, isolated by vacuum fractionation in a 92% yield based on the sodium hydride. The product boiled at 150–151° C. at 15 mm. pressure and gave a copper salt, $(C_{13}H_{24}O_2)_2Cu$, which melted at 113–114° C. It analyzed 13.5% Cu as against a calculated value of 13.2%.

Example VI

An excess of methyl laurate, 321 grams, was treated with one mole of sodium hydride and one-half mole of acetone slowly added as in Example V. The yield of pentadecane-2,4-dione, B. P. 174–176° C. at 15 mm. pressure and M. P. 31–32° C., was 69.8%. Its copper salt, $$(C_{15}H_{27}O_2)_2Cu$$

M. P. 116.5–117° C., analyzed 11.8% Cu as compared with the calculated value of 11.75%.

Example VII

Methyl myristate, 242 grams, was added to a 56.2% slurry of sodium hydride in kerosene containing one mole of sodium hydride and 1 cc. of methanol as catalyst. One-half mole of acetone was then slowly added to the mixture. The theoretical amount of hydrogen was evolved during 3 hours stirring at 30–40° C. The resulting mixture, worked up as in Example V, yielded 112 grams or an 83.7% yield of heptadecane-2,4-dione, B. P. 196–197° C. at 15 mm. pressure, M. P. 50–51° C. Its copper salt, $(C_{17}H_{31}O_2)_2$ Cu, M. P. 117–118° C., analyzed 10.65% Cu as compared with the calculated value of 10.55%.

Example VIII

Alpha tetralon, 93.7 grams or 0.642 mole, was reacted with ethyl acetate in an excess of the latter as solvent using 1.28 moles of sodium hydride as the condensing agent. After stirring the mixture for 1.5 hours at 4–5° C. and then increasing the temperature to 27° C. during the next 1.5 hours the reaction mixture was neutralized as in Example V and the reaction product, acetyl alpha tetralon, separated by crystallization. A yield of 101 grams, or 84%, of the compound, M. P. 56–57° C., was obtained. Its copper salt, $(C_{12}H_{11}O_2)_2Cu$, M. P. 204–205° C., analyzed 13.5% Cu as compared with a calculated value of 13.2%.

Example IX

Methyl laurate, 107 grams in 100 cc. of refined kerosene containing 1 cc. of methanol as catalyst, was heated with 13 grams of sodium hydride at 125° C. for 2 hours. During this time the theoretical amount of hydrogen was evolved. The reaction mixture was then acidified with glacial acetic acid and the beta-keto methyl ester separated by crystallization. The yield of methyl laurolaurate was practically quantitative. After recrystallization, this beta-keto ester melted at 38–40° C. By ketonic hydrolysis the known mono ketone, lauron, $(C_{10}H_{21})_2CO$, M. P. 69–70° C. was obtained in a 95.2% yield.

Example X

Methyl myristate, 121 grams in 100 cc. of refined kerosene containing 1 cc. of methanol as catalyst, was heated with 12 grams of sodium hydride as in Example IX. A 94.7 gram yield, or 83.2% of the theoretical, of crude methyl myristomyristate, M. P. 49–51° C., was isolated by crystallization. By ketonic hydrolysis the already known myriston, $(C_{13}H_{27})_2CO$, M. P. 76–77° C. was obtained in an 87.6% yield.

Example XI

Methyl palmitate, 135 grams in 100 cc. of refined kerosene with 1 cc. of methanol as catalyst, was heated to 120–130° C. for 5 hours. By isolation as in Example IX, 124.4 grams or a yield of 97.6% of crude methyl palmitopalmitate was obtained. After recrystallization the pure beta-keto methyl ester melted at 54–55° C. By ketonic hydrolysis the already known ketone, palmiton, $(C_{15}H_{31})CO$, M. P. 79–80° C., was obtained in a 95.1% yield.

Example XII

Methyl stearate, 149 grams in 100 cc. of refined kerosene as solvent, was treated with 12 grams of sodium hydride at 130–140° C. using 1 cc. of methanol as catalyst. After a reaction period of 3.5 hours the product was isolated as in Example IX. A 94.2% yield of crude methyl stearostearate was obtained which upon recrystallization melted at 60–62° C. By ketonic hydrolysis the known ketone, stearon, M. P. 88–89° C., was obtained in an 87.3% yield.

The following products of the above examples are new compounds: tridecane-2,4-dione, pentadecane-2,4-dione, heptadecane-2,4-dione, acetyl alpha tetralon, methyl laurolaurate, methyl myristromyristate, methyl palmitopalmitate and methyl stearostearate. The above products, with the exception of tridecane-2,4-dione, which normally is a liquid, form white crystals at room temperature having a flaky appearance and a somewhat waxy feel. All of them are clear, practically water-white liquids above their melting points.

The copper salts of tridecane-2,4-dione, pentadecane-2,4-dione, heptadecane-2,4-dione and acetyl alpha tetralon are likewise new compounds which are obtained in the form of minute crystals of a light dull blue color.

In practicing the present invention, the ester employed as one of the reaction constituents may be conveniently used as the solvent medium for the reaction. However, other solvents which do not react with the reactants or reaction products or with the metal hydride condensing agent may be employed. For example, among others, xylene, kerosene, ethers and inert hydrocarbons in general may be advantageously used, especially when the ester reaction constituent is a solid and when the reaction temperature required is relatively high. When the ester reaction constituent has a high boiling point and is difficult to distill, the use of an inert solvent in place of an excess of the ester to act as the reaction solvent obviates the necessity of separating the excess ester by distillation from the reaction mixture.

While I have illustrated in the above examples condensations of aldehydes or ketones with esters effected at temperatures ranging from −10 to 40° C. and ester condensations effected at temperatures ranging from 20 to 140° C., it is to be understood that the above temperature ranges are merely illustrative and are not intended to limit the scope of my invention. The reaction temperature to be employed will depend in each case upon the reactants used and the condensation desired. In general, a higher reaction temperature is required as the molecular weight of the ester employed is increased. For example, condensations of the acetoacetic ester type to produce beta-keto esters from esters of acids having 18 or less carbon atoms per molecule may be effected at a temperature of 140° C. or lower, whereas similar condensations involving esters of higher molecular weight acids may be carried out in accordance with the present invention by using higher reaction temperatures.

I prefer to use sodium hydride as condensing agent in practicing my invention because it is relatively cheap and more conveniently prepared in a suitable state than are other alkali or alkali earth metal hydrides. Furthermore, I prefer to employ an alkali metal hydride rather than an alkali earth metal hydride because the alkali metal hydrides may be prepared conveniently at relatively low temperatures in a finely divided state. However, alkali earth hydrides, such as calcium hydride, may be used effectively as the condensing agent in my process.

Many of the compounds which may be prepared in accordance with the present invention have long been important in laboratory syntheses but because of their relatively high cost have found little, if any, use in commercial chemical processes. These compounds may be prepared relatively cheaply and in good yields by use of the present condensing agents which makes possible an extension of their present uses to commercial fields.

It is understood that the present invention is not limited by the modifications and examples herein disclosed and that any adaptation or modification apparent to a skilled chemist is intended to come within the scope and spirit of the invention.

I claim:

1. A process for preparing ester condensation products comprising reacting a saturated ester with a saturated ester in the presence of a metal hydride of a metal of the group consisting of alkali metals and alkali earth metals, at least one of said esters having a carbon atom adjacent to the carbonyl group which carbon atom is essentially aliphatic in reaction and has attached thereto at least one hydrogen atom.

2. A process for preparing ester condensation products comprising reacting a saturated ester with a saturated ester in the presence of sodium hydride, at least one of said esters having a carbon atom adjacent to the carbonyl group, which carbon atom is essentially aliphatic in reaction and has attached thereto at least one hydrogen atom.

3. A process for preparing ester condensation products comprising adding a saturated ester having a carbon atom adjacent to the carbonyl group which is essentially aliphatic in reaction and which has attached thereto at least one hydrogen atom to a suspension of finely divided sodium hydride in an inert liquid, said suspension being agitated and maintained at a temperature suitable for causing condensation of said ester and subsequently acidifying said reaction mixture and isolating the condensation product.

4. A process for the preparation of an alkyl acetoacetate comprising treating a quantity of sodium hydride suspended in a solvent inert to said sodium hydride with a quantity of an alkyl acetate in excess of the molecular equivalent of said quantity of sodium hydride, while maintaining the reaction temperature at substantially 20–30° C., acidifying the resultant mixture and separating said alkyl acetoacetate.

5. A process for the preparation of ethyl acetoacetate comprising treating a quantity of sodium hydride suspended in a solvent inert to said sodium hydride with a quantity of ethyl acetate in excess of the molecular equivalent of said quantity of sodium hydride while maintaining the reaction temperature at substantially 20–30° C., acidifying the resultant mixture and separating ethyl acetoacetate.

6. A process for the preparation of methyl stearostearate comprising condensing methyl stearate in the presence of sodium hydride and a small amount of methanol as catalyst at a temperature of about 130–140° C., acidifying the reaction mixture and separating said methyl stearostearate.

7. A process for the preparation of methyl laurolaurate comprising condensing methyl laurate in the presence of sodium hydride and a small amount of methanol as catalyst at a temperature of about 120–130° C., acidifying the reaction mixture and separating said methyl laurolaurate.

VIRGIL L. HANSLEY.